G. B. CUBBERLEY.
MANUFACTURE OF TWIST DRILLS, &c.
No. 180,118. Patented July 25, 1876.
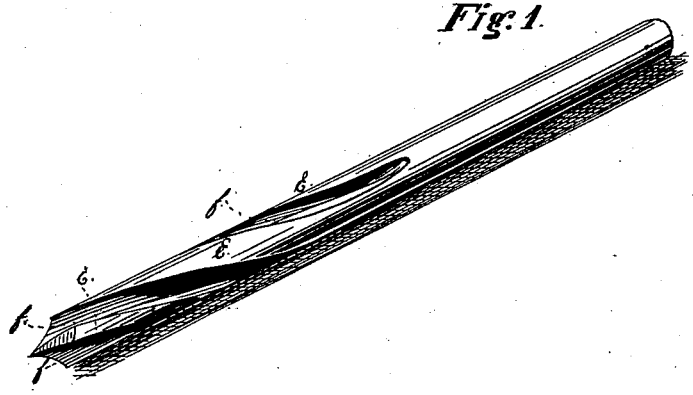
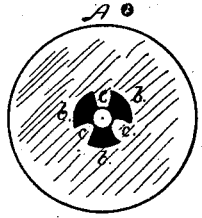
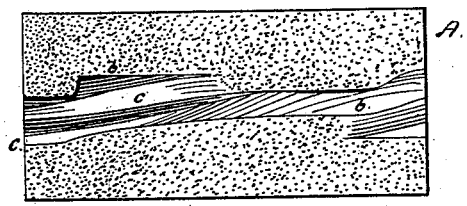
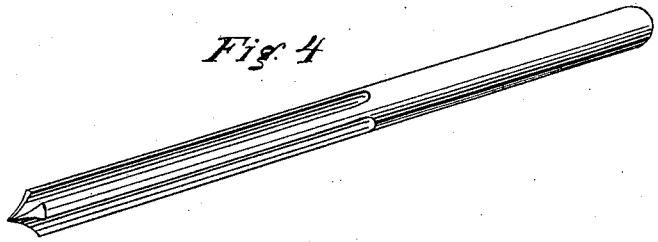
WITNESSES:
INVENTOR:

UNITED STATES PATENT OFFICE.

GARRETT B. CUBBERLEY, OF MILWAUKEE, WISCONSIN, ASSIGNOR TO JAMES P. THOMPSON, OF SAME PLACE.

IMPROVEMENT IN THE MANUFACTURE OF TWIST-DRILLS, &c.

Specification forming part of Letters Patent No. 180,118, dated July 25, 1876; application filed May 11, 1876.

*To all whom it may concern:*

Be it known that I, GARRETT B. CUBBERLEY, of the city of Milwaukee, in the county of Milwaukee and State of Wisconsin, have invented certain new and useful Improvements in the Art of Making Twisted Tools, Drills, Augers, &c.; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention consists in an improvement in the art of making twist-drills and other tools—that is to say, by preparing the stock by cutting three or more longitudinal grooves in it of the form and of a depth relative to the diameter of the stock, and then forcing the same into or through a die-block whose orifice is in shape the counterpart in cross-section of that of the grooved stock, but of which the flanges and grooves are spirally directed.

My device may be easily made by casting the metal block or die described around a core corresponding in shape with the twisted tool to be made, or by casting the metal around a tool of the desired shape, which has first been properly prepared by coating the same with chilling material, which prevents the melted metal from adhering to it, and by means of which the tool may be easily withdrawn by applying a few light strokes of a hammer, leaving the metal block or die in the desired shape.

My invention is further explained by referring to the accompanying drawings.

Figure 1 is the tool represented as it is when twisted by this device. Fig. 2 is an end view of my invention. Fig. 3 is a sectional view of the same. Fig. 4 represents the tool as it is prepared before being twisted with this device.

Similar letters of reference indicate corresponding parts.

A in the accompanying drawings is a metal block or die. *b b b* are spiral-shaped grooves, which correspond in size and shape with the flanges *e e e* in Fig. 1, and may be increased or diminished in number, according to the number of flanges on the tool to be twisted. *e e e* are spiral-shaped flanges, which correspond in size and shape with the grooves *f f f* in Fig. 1, and also correspond in number with the number of grooves in the tool to be twisted.

The tool to be twisted with this device is first grooved straight, as shown in Fig. 4, then heated to a red heat, when it is driven into the opening in the metal block or die, and is thereby twisted into the desired shape.

I claim as an improvement in the art of making twist-drills, &c., the method herein described—that is to say:

Preparing the stock by cutting three or more longitudinal grooves in it of the form and of a depth relative to the diameter of the stock, substantially as described, and then forcing the same into or through a die-block whose orifice is in shape the counterpart in cross-section of that of the grooved stock, but of which the flanges and grooves are spirally directed, as set forth.

In testimony that I claim the foregoing as my own I have affixed my signature in presence of two witnesses.

GARRETT B. CUBBERLEY.

Witnesses:
   J. B. ERWIN,
   K. SHAWVAN.